United States Patent [19]

Tomomatsu et al.

[11] Patent Number: 6,034,165
[45] Date of Patent: Mar. 7, 2000

[54] PROPYLENE RESIN COMPOSITION AND AUTOMOBILE TRIM MEMBER

[75] Inventors: Ryuzou Tomomatsu, Ichihara; Toshiyuki Ishii, Tokyo; Satoru Ohnishi; Toshihide Nara, both of Chiba, all of Japan

[73] Assignee: Idemitsu Petrochemical Co., Ltd., Tokyo, Japan

[21] Appl. No.: 09/101,798

[22] PCT Filed: Jun. 19, 1997

[86] PCT No.: PCT/JP97/02108

§ 371 Date: Aug. 19, 1998

§ 102(e) Date: Aug. 19, 1998

[87] PCT Pub. No.: WO97/49765

PCT Pub. Date: Dec. 31, 1997

[30] Foreign Application Priority Data

Jun. 24, 1996 [JP] Japan .................................... 8-163075

[51] Int. Cl.⁷ ....................................................... C08K 3/34
[52] U.S. Cl. ............................ 524/451; 524/515; 524/587
[58] Field of Search ..................... 524/515, 587, 524/451

[56] References Cited

U.S. PATENT DOCUMENTS 5,219,913  6/1993  Tomomatsu et al. ................... 524/451

FOREIGN PATENT DOCUMENTS

| 0 696 616 | 2/1996 | European Pat. Off. . |
|---|---|---|
| 0 784 074 | 7/1997 | European Pat. Off. . |
| 1-204946 | 8/1989 | Japan . |
| 4-311748A | 4/1992 | Japan . |
| 6-322191A | 11/1994 | Japan . |
| 6-340782 | 12/1994 | Japan . |
| 6-340782A | 12/1994 | Japan . |
| 7-145298A | 6/1995 | Japan . |
| 9-031268A | 2/1997 | Japan . |
| 9-071691A | 3/1997 | Japan . |

OTHER PUBLICATIONS

Domininghaus, Plastic for Engineers–Materials, Properties, Applications, Hanser, p. 105, 1993.

*Primary Examiner*—David W. Wu
*Assistant Examiner*—Ling-Siu Choi
*Attorney, Agent, or Firm*—Oblon, Spivak McClelland, Maier & Neustadt, P.C.

[57] ABSTRACT

A propylene-based resin composition comprising (A) from 42 to 95% by weight of a propylene-based resin having an isotactic pentad fraction of at least 95%, (B) from 1 to 10% by weight of an ethylene-$C_3$–$C_{18}$ α-olefin copolymer having a density of from 0.850 to 0.875 g/cm³ and a melt index of from 0.01 to 25 g/10 min, and prepared in the presence of a metallocene catalyst, (C) from 2 to 18% by weight of a high-density polyethylene having a density of from 0.93 to 0.97 g/cm³ and a melt index of from 0.5 to 10 g/10 min, and (D) from 2 to 35% by weight of talc, the total of the components (B) and (C) being from 3 to 23% by weight.

15 Claims, No Drawings

PROPYLENE RESIN COMPOSITION AND AUTOMOBILE TRIM MEMBER

TECHNICAL FIELD

The present invention relates to propylene-based resin compositions and automobile trim members, and more precisely, to propylene-based resin compositions having good impact resistance, good scratch-whitening resistance and good weld appearance with little uneven gloss and to automobile trim members made by injection-molding of the composition.

BACKGROUND ART

Non-coated automobile trim members are being popularized for the purpose of reducing the production costs, for which there is increasing a great demand for materials having good characteristics of outward appearance and a quiet feel while preventing light reflection. In addition, the requirements of safe and economical materials are being on a higher level, and inexpensive materials with good impact resistance are desired.

As the materials of automobile trim members, much used are inexpensive, popular propylene-based resins. It is known that addition of styrene-based elastomers to propylene-based resins is effective for improving the impact resistance (room temperature Izod impact strength) of the resins. However, styrene-based elastomers are expensive and are problematic in that the moldings comprising them shall have an increased degree of surface gloss. Moreover, adding a large amount of rubber components to propylene-based resins for the purpose of improving the impact resistance of the resins is further problematic in that the scratch-whitening resistance of the resin moldings is poor.

On the other hand, known are molding materials having good low-temperature impact resistance. For example, disclosed are resin compositions comprising a crystalline propylene-ethylene block copolymer and an ethylene-α-olefin copolymer as produced in the presence of a metallocene catalyst (see Japanese Patent Application Laid-Open (JP-A) Hei-7-145272, JP-A Hei-7-145298); resin compositions comprising a propylene-based resin and an ethylene-butene-1 copolymer having a relatively large butene-1 unit content (the copolymer is produced substantially in the presence of a metallocene catalyst) (see JP-A Hei-6-192506, JP-A Hei-7-18151); and resin compositions comprising a propylene-based resin and an ethylene-octene-1 copolymer having a relatively large octene-1 content (the copolymer is produced substantially in the presence of a metallocene catalyst) (see International Patent Application Laid-Open No. 94-6859).

Though having good low-temperature impact resistance, those resin compositions are still defective in that their moldings often have uneven gloss and poor scratch-whitening resistance.

DISCLOSURE OF THE INVENTION

Given that situation, we, the inventors have made the present invention, and the object of the invention is to provide propylene-based resin compositions having good impact and scratch-whitening resistance and good weld appearance with little uneven gloss and to provide automobile trim members to be made by injection-molding of the composition. The members do not require coating, and are therefore economical.

The inventors have assiduously studied and, as a result, have found that a resin composition that comprises a propylene-based resin having specific properties to which are added a specific impact-resistant agent, a high-density polyethylene and talc can attain the object noted above. On the basis of this finding, the present invention has been completed.

Specifically, the present invention provides, as the first invention (I), a propylene-based resin composition comprising (A) from 42 to 95% by weight of a propylene-based resin having an isotactic pentad fraction of at least 95%, (B) from 1 to 10% by weight of an ethylene-$C_3$-18 α-olefin copolymer having a density of from 0.850 to 0.875 g/cm$^3$ and a melt index of from 0.01 to 25 g/10 min, and prepared in the presence of a metallocene catalyst, (C) from 2 to 18% by weight of a high-density polyethylene having a density of from 0.93 to 0.97 g/cm$^3$ and a melt index of from 0.5 to 10 g/10 min, and (D) from 2 to 35% by weight of talc, the total of the components (B) and (C) being from 3 to 23% by weight.

It also provides, as the second invention (II), a propylene-based resin composition of the first invention (I) where the component (A) satisfies the following requirements (1) to (4). (1) The propylene-based resin of (A) comprises (a) from 70 to 98% by weight of a fragment insoluble in paraxylene at 23° C. and (b) from 2 to 30% by weight of a fragment soluble in paraxylene at 23° C. (2) The fragment (a) has a relaxation time, τ, of from 0.01 to 0.35 seconds at an angular frequency, ω, of 10°/sec as obtained through melt viscoelastometry, and has a molecular weight distribution index (PDI) of from 1 to 18, which is represented by $\omega_2/10\omega_1$ where $\omega_1$ indicates an angular frequency at which the modulus of stored elasticity, G', as obtained through melt viscoelastometry is 2×10$^2$ Pa, and $\omega_2$ indicates an angular frequency at which G' is 2×10$^4$ Pa. (3) The fragment (b) has a limiting viscosity [η] (in decalin at 135° C.) of from 2.0 to 10 dl/g. (4) The ethylene unit content of (A) is from 1 to 17% by weight.

The invention further provides automobile trim members to be produced by injection-molding the propylene-based resin composition.

BEST MODES OF CARRYING OUT THE INVENTION

The properties of the propylene-based resin of the component (A) to be in the resin composition of the present invention are mentioned below.

In the first invention and the second invention, the propylene-based resin of the component (A) must have an isotactic pentad fraction of at least 95%. The isotactic pentad fraction as referred to herein can be obtained from the signals appearing in the methyl carbon region in the $^{13}$C-NMR spectral pattern of the resin. Propylene-based resins having an isotactic pentad fraction of smaller than 95%, if combined with the other components, produce resin compositions of which the stiffness and the impact resistance are not well balanced and which has poor scratch-whitening resistance. Accordingly, the isotactic pentad fraction of the propylene-based resin of the component (A) is preferably at least 96%.

In the second invention, the component (A), when fractionated in paraxylene at 23° C., comprises (a) from 70 to 98% by weight of a paraxylene-insoluble fragment and (b) from 2 to 30% by weight of a paraxylene-soluble fragment. Moldings comprising a propylene-based resin having a paraxylene-insoluble content of smaller than 70% by weight will have low stiffness, uneven gloss in the creped area, and bad weld appearance, and are often colored unevenly, and flow marks are often formed on their surface; while those comprising a propylene-based resin having a paraxylene-insoluble content of larger than 98% by weight will have poor impact resistance, bad weld appearance, and uneven gloss in the creped area. In order that the moldings of the composition of the invention may have well-balanced properties of good appearance, high stiffness, high impact resistance and even gloss, the insoluble content of the component (A) is preferably from 75 to 93% by weight, more preferably from 80 to 91% by weight.

The fractionation of the component (A) in paraxylene at 23° C. may be effected by first completely dissolving the resin in paraxylene at 130° C. followed by cooling the resulting solution to be at 23° C., whereupon the resin is fractionated into the soluble fragment and the insoluble fragment.

In the second invention, the fragment (a) must have a relaxation time, τ, of from 0.01 to 0.35 seconds at an angular frequency, ω, of 10°/sec as obtained through melt viscoelastometry. Moldings comprising the component (A) of which the fragment (a) has a relaxation time, τ, of longer than 0.35 seconds will have bad weld appearance and uneven gloss in the creped area, and are often colored unevenly, and flow marks are often formed on their surface. In order that the moldings may have good appearance and even gloss, the fragment (a) preferably has a relaxation time, τ, of from 0.02 to 0.30 seconds, more preferably from 0.02 to 0.27 seconds. To measure the relaxation time, τ, of the fragment (a), sinusoidal shear strain is imparted to a sample of the fragment (a) at a temperature of 175° C. and at an angular frequency, ω, of 10°/sec, using Rheometrics' System 4 (rotary rheometer with a cone plate of 25 mmφ and a cone angle of 0.1 radian), and the modulus of stored elasticity G' and the modulus of loss elasticity G" of the sample are obtained. The relaxation time, τ, of the sample is represented by t=G'/ωG".

The fragment (a) has a molecular weight distribution index (PDI) of from 1 to 18, which is represented by $\omega_2/10\omega_1$ where $\omega_1$ indicates an angular frequency at which the modulus of stored elasticity, G', as obtained through melt viscoelastometry is $2 \times 10^2$ Pa, and $\omega_2$ indicates an angular frequency at which G' is $2 \times 10^4$ Pa. Moldings comprising the component (A) of which the fragment (a) has PDI of larger than 18 will have bad weld appearance and uneven gloss in the creped area, and are often colored unevenly. In order that the moldings may have good appearance and even gloss, the molecular weight distribution index (PDI) of the fragment (a) is preferably from 2 to 16, more preferably from 2 to 14. PDI of the fragment (a) is measured, using Rheometrics' System 4 (rotary rheometer with a cone plate of 25 mmφ and a cone angle of 0.1 radian), at 175° C. and under strain of 30%.

The fragment (b) must have a limiting viscosity [η] (in decalin at 135° C.) of from 2.0 to 10 dl/g. Moldings comprising the component (A) of which the fragment (b) has [η] of smaller than 2.0 dl/g will have bad weld appearance and uneven gloss in the creped area; while those comprising the component (A) of which the fragment (b) has [η] of larger than 10 dl/g will have flow marks as the moldability of the composition is poor, and, in addition, they will have poor impact resistance. In order that the moldings may have good weld appearance, even gloss in the creped area, and high impact resistance and that the composition may have good moldability, [η] of the fragment (b) is preferably from 2.2 to 9.0 dl/g, more preferably from 2.4 to 8.0 dl/g.

In the second invention, in addition, the propylene-based resin of the component (A) must have an ethylene unit content of from 1 to 17% by weight. If the content in question is smaller than 1% by weight, the moldings comprising the component (A) will have bad weld appearance, uneven gloss in the creped area, and poor impact resistance. If an additional rubber component is added to the composition in order to improve the impact resistance of the moldings of the composition, the moldings shall have poor scratch-whitening resistance. On the other hand, if the ethylene unit content of the component (A) is larger than 17% by weight, the moldings comprising the component (A) will have bad weld appearance, uneven gloss in the creped area, and poor stiffness, and, in addition, flow marks will be formed on the moldings as the moldability of the composition is poor. In order that the moldings may have well-balanced properties of good weld appearance, even gloss in the creped area, good impact resistance and high stiffness and that the composition may have good moldability, the ethylene unit content of the component (A) is preferably from 4 to 17% by weight, more preferably from 6 to 17% by weight.

In the first and second inventions (herein referred to as the present invention), preferably, the propylene-based resin of the component (A) has a melt index (MI) of from (1 to 100 g/10) min, when measured at a temperature of 230° C. and under a load of 2.16 kgf. If the component (A) has MI of smaller than 1 g/10 min, the composition comprising the component (A) will have poor moldability as its fluidity is poor. However, if the component (A) has MI of larger than 100 g/10 min, the mechanical properties of the moldings comprising the component (A) will be bad. In view of the balance of the moldability of the composition and the mechanical properties of the moldings, MI of the component (A) is preferably from (5 to 70 g/10 min) more preferably from (10 to 40 g/10 min.) MI of the component (A) is obtained according to JIS K-7210. Especially preferred is (a mixture of a propylene-based resin having MI of larger than 8 g/10 min and a propylene-based resin having MI of smaller than 5 g/10 min, in which the latter propylene-based resin having MI of smaller than 5 g/10 min is in an amount of from 5 to 30% by weight) as the mixture is molded into moldings having good impact resistance. In this mixture, however, if the amount of the propylene-based resin having MI of smaller than 5 g/10 min is larger than 30% by weight, the composition comprising the resin mixture will have poor moldability and the moldings of the composition will have flow marks on their surface.

The method of producing the propylene-based resin of the component (A) is not specifically defined, provided that it produces propylene-based resins satisfying the requirements noted above, and various methods are employable herein for producing the component (A). For example, the constituent components which have been prepared separately may be blended to give the component (A); or, as will be mentioned below, monomers are polymerized in a multi-stage polymerization manner in the presence of a catalyst system comprising (a) a solid component composed of (i) a solid catalyst component containing magnesium, titanium, a halogen atom and an electron donor, and optionally (ii) a crystalline polyolefin, (b) an organic aluminium compound, and (c) an ordinary electron-donating compound, to give a propylene-ethylene block copolymer of the component (A).

For the multi-stage polymerization to give the propylene-ethylene block copolymer of the component (A), for example, employable is the method mentioned below.

In the catalyst system to be used for the multi-stage polymerization, the solid catalyst component (a) is composed of the solid catalyst component (i) containing magnesium, titanium, a halogen atom and an electron donor, and optionally the component (ii) of crystalline polyolefin. The solid catalyst component (a) can be prepared by contacting a magnesium compound and a titanium compound with an electron donor. For this, the halogen atom is in the magnesium compound and/or the titanium compound in the form of a halide.

The magnesium compound may be a reaction product of a metal magnesium, a halogen and/or a halogen-containing compound, and an alcohol.

The titanium compound may be any known one, but preferred is a high-halogen, titanium compound such as typically titanium tetrachloride. One or more titanium compounds may be used either singly or as combined.

The electron donor may be selected from the electron-donating compounds which will be mentioned hereinunder as examples of the component (c).

To prepare the solid catalyst component (i), employable are any known methods (see JP-A Sho-53-43094, Sho-55-135102, Sho-55-135103, Sho-56-18606, Sho-56-166205, Sho-57-63309, Sho-57-190004, Sho-57-300407, Sho-58-47003).

The crystalline polyolefin of the component (ii) which is optionally used for preparing the solid component (a) includes those to be obtained from $C_{2-10}$ α-olefins, such as polyethylene, polypropylene, polybutene-1, poly-4-methyl-1-pentene. Those crystalline polyolefins may be prepared by any known methods, for example, by pre-polymerizing propylene in the presence of a combination of the solid catalyst component (i) noted above, an organic aluminium compound and optionally an electron-donating compound (pre-polymerization method).

The aluminium compound of the component (b) may be represented by a general formula (I):

$$AlR^1_p X_{3-p} \qquad (I)$$

wherein R1 represents an alkyl group having from 1 to 20 carbon atoms, or an aryl group having from 6 to 20 carbon atoms; X represents a halogen atom; and p represents a number of from 1 to 3.

The catalyst system generally comprises an electron-donating compound as the component (c). The electron-donating compound comprises any of oxygen, nitrogen, phosphorus, sulfur and silicon atoms, and will basically improve the stereospecificity of propylene polymers.

As the electron-donating compound, for example, preferably used are organic silicon compounds, esters, ketones, ethers, thioethers, acid anhydrides, and acid halides.

As mentioned in detail hereinabove, Ziegler-type solid catalysts are used for the production of propylene polymers, for which use of metallocene catalysts is being specifically noted.

The propylene-based resin of the component (A) for use in the invention can be produced in various methods, for example, can be produced in multi-stage polymerization using the catalyst system mentioned above. In the multi-stage polymerization, the order and the number of the polymerization stages may be freely determined. For example, in the initial polymerization (first-stage polymerization), propylene may be homo-polymerized or co-polymerized (for example, with ethylene and other olefins in an amount of not larger than 2% by weight) to give a crystalline propylene-based polymer, and in the next, second-stage and later steps, ethylene and propylene may be subjected to random copolymerization, or ethylene, propylene and other α-olefins and polyenes may be subjected to random copolymerization.

For example, the components (a) to (c) are mixed in a predetermined ratio to give a catalyst system, and immediately after the preparation of the catalyst system, the monomers may be applied thereto to start the polymerization of the monomers; or alternatively, after the catalyst system is ripened for 0.2 to 3 hours, the monomers may be applied thereto. After the polymerization, the reaction mixture maybe post-treated in any ordinary manner.

The resin composition of the present invention may comprise one or more propylene-based resins of the component (A) either singly or as combined.

The resin composition of the invention comprises, as the component (B), an ethylene-$C_{3-18}$ α-olefin copolymer. The ethylene-α-olefin copolymer has a density of from 0.850 to 0.875 g/cm³. If its density is larger than 0.875 g/cm³, the copolymer is not effective in improving the impact resistance of the moldings of the composition. In view of the stiffness and the impact resistance of the moldings, the preferred range of the density of the copolymer is between 0.855 and 0.870 g/cm³. The copolymer has a melt index (MI) of from 0.01 to 25 g/10 min. If its MI is smaller than 0.01 g/10 min, the copolymer not effective in improving the impact resistance of the moldings of the composition, and the moldings will have flow marks. If, however, the copolymer has MI of larger than 25 g/10 min, the moldings comprising the copolymer will have uneven gloss in the creped area and have poor impact resistance. In order that the moldings may have good impact resistance and even gloss and that the composition has good moldability, MI of the copolymer preferably falls between (0.01 and 6 g/10 min,) more preferably between (0.01 and 1 g/10 min). MI of the copolymer is measured at 190° C. and under a load of 2.16 kgf.

The comonomers of the copolymer, $C_{3-18}$ α-olefins include, for example, linear x-olefins such as butene-1, pentene-1, hexene-1, octene-1, nonene-1, decene-1, dodecene-1; and branched α-olefins such as 3-methylbutene-1,4-methylpentene-1. Of those, especially preferred are linear $C_{4-10}$ α-olefins. One or more of these α-olefins can be used either singly or as combined. If desired, the copolymer may additionally comprise a diene component of, for example, dicyclopentadiene, ethylidene-norbornene, 1,4-hexadiene, 1,9-decadiene, and vinyl-norbornene.

The α-olefin content of the ethylene-α-olefin copolymer of the component (B) is not specifically defined, and may be so determined that the density of the copolymer may fall the defined range. In general, however, the α-olefin content is preferably from 20 to 70% by weight. The ethylene-α-olefin copolymer must be prepared in the presence of a metallocene catalyst. So far as the copolymer has the properties defined above, the method for producing the copolymer is not specifically defined. As the metallocene catalyst, for example, employable is any of single-site catalysts (SSC) and constrained geometric catalysts (CGC). Specific examples of such metallocene catalysts are disclosed in, for example, JP-A Hei-6-192506, Hei-7-145298, Hei-7-18151, Hei-7-145272, and International Patent Laid-Open WO94/06859, and in JP-A Hei-5-43618, Hei-5-51414, International Patent Laid-Open WO96/04317, WO93/13140, WO91/04255, and WO91/04257. More concretely mentioned are transition metal complexes having a cyclopentadienyl, mono (di, tri, tetra or penta) methylcyclopentadienyl or indenyl group. In their use in polymerization, these metallocene catalysts are generally combined with alkylaluminoxanes or ionic compounds such as boron compounds.

One or more such ethylene-α-olefin copolymers of the component (B) may be used either singly or as combined.

For the ethylene-α-olefin copolymers of the component (B) for use in the invention, some commercial products are available, for example, ENGAGE (trade name of the Dow Chemical Co.) POEs sold by Dow Chemical Japan Co. Any of those commercially-available compounds are usable herein.

The resin composition of the present invention comprises a high-density polyethylene as the component (C). The high-density polyethylene is not specifically defined, but generally used is one having a density of from 0.93 to 0.97 g/cm$^3$ and a melt index of from 0.5 to 10 g/10 min.

The composition further comprises talc as the component (D). In view of the physical properties of the moldings, such as stiffness, impact resistance, scratch-whitening resistance, weld appearance and gloss, preferred is talc grains having a mean grain size of from 1 to 8 μm and a mean aspect ratio of not smaller than 4. Especially preferred are those as produced by mechanical grinding or gaseous stream grinding, in view of the physical properties and the stiffness of the moldings.

Regarding the amounts of the components constituting the resin composition of the invention, the composition comprises from 42 to 95% by weight of the propylene-based resin of the component (A), from 1 to 10% by weight of the ethylene-α-olefin copolymer of the component (B), from 2 to 18% by weight of the high-density polyethylene of the component (C), and from 2 to 35% by weight of talc of the component (D), in which the sum of the components (B) and (C) falls between 3 and 23% by weight.

If the amount of the component (A) is smaller than 42% by weight, the moldings will have bad weld appearance and uneven gloss in the creped area. If so, in addition, the composition has poor moldability, and the moldings will have flow marks on their surface. On the other hand, if the amount of the component (A) is larger than 95% by weight, the impact resistance of the moldings will be poor. If the amount of the component (B) is smaller than 1% by weight, the component (B) will be ineffective in improving the impact resistance of the moldings. However, if it is larger than 10% by weight, the scratch-whitening resistance of the moldings will be poor. If the amount of the component (C) is smaller than 2% by weight, the component (C) will be ineffective in improving the scratch-whitening resistance of the moldings. However, if it is larger than 18% by weight, the moldings will have bad weld appearance and uneven gloss in the creped area, and will have poor stiffness at high temperatures. If the amount of the component (D) is larger than 35% by weight, the moldings will have bad weld appearance, poor impact resistance, and poor scratch-whitening resistance. If so, in addition, the composition will have poor moldability and the moldings will have flow marks on their surface. If the sum of the components (B) and (C) is smaller than 3% by weight, the moldings will have poor impact resistance and poor scratch-whitening resistance; but if it is larger than 23% by weight, the moldings will have bad weld appearance and uneven gloss in the creped area, and have poor stiffness. In order that the moldings may have well-balanced, good properties of weld appearance, even gloss in the creped area, impact resistance, scratch-whitening resistance and stiffness and that the composition may have better moldability, the preferred range of each component constituting the composition is as follows: The amount of the component (A) is from 58 to 85% by weight; that of the component (B) is from 2 to 8% by weight; that of the component (C) is from 3 to 15% by weight; that of the component (D) is from 7 to 30% by weight; and the sum of the components (B) and (C) is from 6 to 19% by weight.

The resin composition of the invention may optionally contain various known additives such as pigment, nucleating agent, anti-aging agent, antioxidant, antistatic agent, flame retardant, dispersant, etc.

The method for producing the propylene-based resin composition of the invention is not specifically defined. For example, the components (A), (B), (C) and (D) and optionally other additives may be melt-kneaded, using a single-screw extruder, a double-screw extruder, a Bumbury mixer, a kneader, a roll mixer or the like, to give the composition.

The automobile trim members of the invention are produced by molding the propylene-based resin composition in any conventional injection-molding methods (including compressed injection-molding methods, vapor-blowing injection-molding methods). The automobile trim members include, for example, instrument panels, door trims, console boxes, etc.

Now, the invention is described in more detail hereinunder with reference to the following Examples, which, however, are not intended to restrict the scope of the invention.

The physical properties of the moldings produced and the isotactic pentad fraction of the propylene-based resins produced were obtained according to the methods mentioned below.

(1) Izod Impact Strength

Test pieces of molding samples were tested according to JIS K7110 to measure the Izod impact strength thereof.

(2) Modulus of Bending Elasticity

Test pieces of molding samples were tested according to JIS K7203 to measure the modulus of bending elasticity thereof.

(3) Scratch-whitening Resistance

The creped area of each test piece of molding samples was rubbed with the ridges on the edge of a ¥100 coin as pressed against it. The test pieces having been greatly scratched and whitened on the rubbed area were evaluated bad (rank C); those having been somewhat scratched and whitened thereon were evaluated acceptable (rank B); and those having been scratched and whitened little were evaluated good (rank A).

(4) Surface Gloss

The surface gloss of the creped area of test pieces of molding samples was visually checked. The test pieces with great uneven gloss were evaluated bad (rank C); those with some uneven gloss were evaluated acceptable (rank B); and those with little uneven gloss were evaluated good (rank A).

(5) Isotactic Pentad Fraction 220 mg of a resin sample was put into a 10φ NMR test tube, to which was added 3 ml of 1,2,4-trichlorobenzene/heavy benzene (90/10 vol. %), and the sample was dissolved in the solvent at 140° C. to give a uniform solution. The solution was subjected to $^{13}$C-NMR under the following condition.

Frequency: 45 MHz

Spectrum Width: 25000 Hz

Temperature: 130° C.

Pulse Width: 8 μsec

Pulse Repetition Interval: 4 sec

Number of Integration: 10000 times

The other properties of propylene-based resin samples prepared in the following Examples were measured according to the methods mentioned herein.

1. Production of Propylene Block Copolymer (PP-2)

(1) Preparation of Magnesium Compound

A 500-liter glass reactor equipped with a stirrer was fully purged with nitrogen gas, and 97.2 kg of ethanol, 640 g of iodine and 6.4 kg of metal magnesium were put into the reactor and reacted therein while being stirred under reflux to give a solid reaction product. The reaction mixture containing this solid reaction product was dried under reduced pressure to obtain a magnesium compound (solid reaction product).

(2) Preparation of Solid Catalyst Component 30 kg of the magnesium compound (not ground) prepared in (1), 150 liters of pure heptane, 4.5 liters of silicon tetrachloride, and 4.3 liters of di-n-butyl phthalate were put into a 500-liter, three-neck glass flask which had been fully purged with nitrogen gas. With stirring the contents of the flask at 90° C., 144 liters of titanium tetrachloride was added thereto, and reacted at 110° C. for 2 hours. The solid product formed was isolated, and washed with pure heptane at 80° C. Next, 228 liters of titanium tetrachloride was added thereto, and reacted for 2 hours at 110° C., and the resulting reaction product was fully washed with pure heptane. Thus was obtained a solid catalyst component.

(3) Pre-treatment prior to Polymerization 230 liters of pure n-heptane was put into a 500-liter reactor equipped with a stirrer, and 25 kg of the solid catalyst component obtained in (2) was added thereto. Next, 1.0 mol, relative to 1 mol of titanium in the solid catalyst component, of triethylaluminium and 1.8 mols, relative to the same, of dicyclopentyldimethoxysilane were added thereto. Next, propylene was introduced thereinto to be up to 0.3 kg/cm$^2$G in terms of the propylene partial pressure, and reacted at 40° C. for 4 hours. After the reaction, the thus-processed solid catalyst component was washed several times with n-heptane, and carbon dioxide was applied thereto for 24 hours with stirring.

(4) Production of Propylene Block Copolymer (PP-2) through Polymerization

In the first stage, the solid catalyst component having been processed in (3) was fed into a 200-liter polymerization reactor (first reactor) equipped with a stirrer, in an amount of 3 mmols/hr in terms of Ti of the component, along with 4.0 mmols/kg-PP of triethylaluminium and 0.4 mmols/kg-PP of dicyclopentyldimethoxysilane, and propylene and ethylene were copolymerized in this reactor at a temperature of 85° C. and under a pressure (total pressure) of 28 kg/cm$^2$G, while the amount of ethylene and that of hydrogen being fed into the reactor were controlled to make the resulting copolymer have a predetermined ethylene content and a predetermined molecular weight. In this step, the amount of triethylaluminium and that of dicyclopentyldimethoxysilane fed into the first reactor were related to the amount of the copolymer PP discharged out of the reactor.

Next, the powder formed was continuously discharged out of the first reactor, and transferred into a 200-liter polymerization reactor (second reactor) equipped with a stirrer. The second reactor was run at a temperature of 70° C. and under a pressure (total pressure) of 15 kg/cm$^2$G, and the amount of propylene, that of ethylene and that of hydrogen fed thereinto were controlled to obtain a copolymer having a predetermined composition and a predetermined molecular weight.

The powder formed was continuously discharged out of the second reactor, and granulated to obtain a propylene block copolymer (PP-2). This had an isotactic pentad fraction of 97.0% and a melt index of 13.

2. Production of Propylene Block Copolymer (PP-3)

(1) Preparation of Magnesium Compound

A 12-liter glass reactor equipped with a stirrer was fully purged with nitrogen gas, and about 4,860 g of ethanol, 32 g of iodine and 320 g of metal magnesium were put into the reactor and reacted therein while being stirred under reflux to give a solid reaction product. The reaction mixture containing this solid reaction product was dried under reduced pressure to obtain a magnesium compound (solid reaction product).

(2) Preparation of Solid Catalyst Component 160 g of the magnesium compound (not ground) prepared in (1), 800 ml of pure heptane, 24 ml of silicon tetrachloride, and 23 ml of diethyl phthalate were put into a 5-liter, three-neck glass flask which had been fully purged with nitrogen gas. With stirring the contents of the flask at 90° C., 770 ml of titanium tetrachloride was added thereto, and reacted at 110° C. for 2 hours. The solid product formed was isolated, and washed with pure heptane at 80° C. Next, 1220 ml of titanium tetrachloride was added thereto, and reacted for 2 hours at 110° C., and the resulting reaction product was fully washed with pure heptane. Thus was obtained a solid catalyst component.

(3) Pre-treatment prior to Polymerization 230 liters of n-heptane was put into a 500-liter reactor equipped with a stirrer, and 25 kg of the solid catalyst component obtained in (2) was added thereto. Next, 0.6 mols, relative to 1 mol of titanium in the solid catalyst component, of triethylaluminium and 0.4 mols, relative to the same, of cyclohexylmethyldimethoxysilane were added thereto. Next, propylene was introduced thereinto to be up to 0.3 kg/cm$^2$G in terms of the propylene partial pressure, and reacted at 20° C. for 4 hours. After the reaction, the thus-processed solid catalyst component was washed several times with n-heptane, and carbon dioxide was applied thereto for 24 hours with stirring.

(4) Production of Propylene Block Copolymer (PP-3) through Polymerization

In the first stage, the solid catalyst component having been processed in (3) was fed into a 200-liter polymerization reactor (homo-polymerization reactor) equipped with a stirrer, in an amount of 3 mmols/hr in terms of Ti of the component, along with 0.50 mols/hr of triethylaluminium and 50 mmols/hr of cyclohexylmethyldimethoxysilane, and propylene was polymerized in this reactor at a temperature of 85° C. and under a propylene partial pressure of 28 kg/cm$^2$G, while hydrogen gas was introduced thereinto so as to make the resulting polymer have a predetermined molecular weight.

Next, the powder formed was continuously discharged out of the homo-polymerization reactor, and transferred into a random-copolymerization reactor (second-stage reactor) similar to the homo-polymerization reactor. To the second-stage reactor of the random-copolymerization reactor, propylene and ethylene were fed and random-copolymerized therein at a temperature of 70° C. and under a pressure of 15 kg/cm$^2$G. In this stage, the amount of propylene and that of ethylene fed to the reactor were controlled to obtain a copolymer having a predetermined ethylene content. The powder formed was continuously discharged out of the random copolymerization reactor, and granulated to obtain a propylene block copolymer (PP-3). This had an isotactic pentad fraction of 94.0% and a melt index of 3.

EXAMPLES 1 TO 6, COMPARATIVE EXAMPLES 1 TO 6

Components (A) to (D), (A) of propylene-based resin (single substance or blended mixture), (B) of ethylene-α-olefin copolymer or ethylene-propylene rubber, (C) of high-density polyethylene and (D) of talc, of which the amounts and the properties are shown in Table 1 (the amounts of (A) to (D) are % by weight relative to 100% by weight of the total of (A) to (D)), were mixed with 0.2 parts by weight, relative to 100 parts by weight of (A) to (D) combined, of a dispersant of magnesium stearate and 1.3 parts by weight, relative to the same, of a dark gray pigment (PP-DHH7343, trade name of a product of Dainichi Seika Co.), and kneaded in a double-screw kneader to prepare various molding materials. Each molding material was molded in an injection-molding machine at a resin temperature of 220° C. to produce test pieces (140×140×3 mm, creped sheets for trims). The physical properties of these test pieces were measured, and the data obtained are shown in Table 1.

TABLE 1

| | Propylene-based Resin (A) | | | | | | | | | |
|---|---|---|---|---|---|---|---|---|---|---|
| | | amount | | amount | 23° C. p-xylene-insoluble fragment | | | 23° C. p-xylene soluble fragment | | ethylene content | isotactic pentad fraction |
| | polymer | wt. % | polymer | wt. % | wt. % | τ (sec) | PDI | wt. % | [η] | (wt. %) | (%) |
| Ex. 1 | PP-1 | 54 | PP-3 | 15 | 86 | 0.47 | 38 | 14 | 3.9 | 8 | 95.6 |
| Ex. 2 | PP-2 | 54 | PP-3 | 15 | 88 | 0.26 | 10 | 12 | 3.3 | 7 | 96.7 |
| Ex. 3 | PP-2 | 45 | PP-3 | 15 | 88 | 0.26 | 10 | 12 | 3.4 | 7 | 96.6 |
| Ex. 4 | PP-2 | 48 | PP-3 | 15 | 91 | 0.26 | 10 | 9 | 3.3 | 7 | 96.7 |
| Ex. 5 | PP-2 | 45 | PP-3 | 20 | 88 | 0.27 | 10 | 12 | 3.4 | 7 | 96.3 |
| Ex. 6 | PP-2 | 58 | — | 0 | 90 | 0.25 | 10 | 10 | 3.3 | 6 | 97.4 |
| Comp. Ex. 1 | PP-4 | 54 | PP-3 | 15 | 84 | 0.26 | 10 | 16 | 3.1 | 9 | 94.0 |
| Comp. Ex. 2 | PP-2 | 54 | PP-3 | 15 | 88 | 0.26 | 10 | 12 | 3.3 | 7 | 96.7 |
| Comp. Ex. 3 | PP-4 | 45 | PP-3 | 15 | 84 | 0.26 | 10 | 16 | 3.4 | 9 | 94.0 |
| Comp. Ex. 4 | PP-4 | 48 | — | 0 | 85 | 0.25 | 10 | 15 | 3.1 | 9 | 94.0 |
| Comp. Ex. 5 | PP-2 | 58 | PP-3 | 15 | 88 | 0.26 | 10 | 12 | 3.1 | 7 | 96.7 |
| Comp. Ex. 6 | PP-2 | 57 | — | 0 | 90 | 0.25 | 10 | 10 | 3.3 | 6 | 97.4 |

| | Component | | Component (D) | Properties | | | |
|---|---|---|---|---|---|---|---|
| | Component (B) | | (C) high-density polyethylene, | | Izod impact strength | modulus of bending elasticity | scratch-whitening resistance | surface gloss |
| | compound | amount, wt. % | wt. % | talc, wt. % | (KJ/m) | (MPa) | | |
| Ex. 1 | LL-1 | 4 | 4 | 23 | 53 | 2720 | A | B (note 2) |
| Ex. 2 | LL-1 | 4 | 4 | 23 | 45 | 2800 | A | A |
| Ex. 3 | LL-1 | 2 | 15 | 23 | 38 | 2770 | A | B |
| Ex. 4 | LL-1 | 4 | 10 | 23 | 60 | 2680 | A | B |
| Ex. 5 | LL-1 | 2 | 10 | 23 | 47 | 2830 | A | B |
| Ex. 6 | LL-1 | 4 | 15 | 23 | 58 | 2670 | A | B |
| Comp. Ex. 1 | LL-1 | 4 | 4 | 23 | 62 | 2370 | C | A |
| Comp. Ex. 2 | EPR | 4 | 4 | 23 | 23 | 2780 | B | B |
| Comp. Ex. 3 | LL-1 | 2 | 15 | 23 | 53 | 2370 | B | B |
| Comp. Ex. 4 | LL-1 | 4 | 25 | 23 | 76 | 2160 | B | C |
| Comp. Ex. 5 | LL-1 | 4 | 0 | 23 | 22 | 2870 | C | A |
| Comp. Ex. 6 | — | 0 | 20 | 23 | 16 | 2950 | A | B to C |

(Note 1) Description of Components (A) to (D):
PP-1: Idemitsu Polypro J758H, trade name of a product of Idemitsu Petrochemical Co.; having an isotactic pentad fraction of 96.0% and a melt index of 11.
PP-4: Idemitsu Polypro J762H, trade name of a product of Idemitsu Petrochemical Co,; having an isotactic pentad fraction of 94.0%.
LL-1: ethylene-octene-1 copolymer, ENGAGE EG8180, trade name of a product of Dow Chemical Japan Co.; having an octene-1 content of 26 wt. %, MI of 0.6 g/10 min, and a density of 0.863 g/cm$^3$.
EPR: ethylene-propylene rubber, EP-02P, trade name of a product of Nippon Synthetic Rubber Co.; having a propylene content of 26 wt. %, MI of 1.6 g/10 min, and a density of 0.860 g/cm$^3$.
High-density Polyethylene: Idemitsu Polyethy 210J, trade name of a product of Idemitsu Petrochemical Co.; having a density of 0.968 g/cm$^3$, and MI of 6.0 g/10 min.
Talc: JM156, trade name of a product of Asada Flour Milling Co.; having a mean grain size of 4.4 μm (as measured with a laser grain analyzer, SALD2000A manufactured by Shimazu Seisaku-sho Co.).
(Note 2) Regarding the surface gloss, the products of Example 1 were evaluated as B, like those of Examples 3 to 6, but the former were somewhat inferior to the latter.

Industrial Applicability

The moldings of the propylene-based resin composition of the present invention have good impact resistance, good scratch-whitening resistance, good appearance including weld appearance, and even gloss. As flat finishing of the moldings can be omitted, the production costs of the moldings can be reduced. The resin composition of the invention is favorably used for producing automobile trim members.

The automobile trim members made from the resin composition of the invention have good outward appearance including even gloss and weld appearance, and may be used without being coated with finish paint. In addition, they have good stiffness, impact resistance and scratch-whitening resistance. Therefore, the resin composition of the invention is favorably used for producing automobile trim members such as creped instrument panels.

We claim:
1. A propylene-based resin composition comprising (A) from 42 to 95% by weight of a propylene-based resin having an isotactic pentad fraction of at least 95%, (B) from 1 to 10% by weight of an ethylene-$C_{3-18}$ α-olefin copolymer having a density of from 0.850 to 0.875 g/cm$^3$ and a melt index of from 0.01 to 25 g/10 min, and prepared in the presence of a metallocene catalyst, (C) from 2 to 18% by weight of a high-density polyethylene having a density of from 0.93 to 0.97 g/cm$^3$ and a melt index of from 0.5 to 10 g/10 min, and (D) from 2 to 35% by weight of talc, the total of the components (B) and (C) being from 3 to 23% by weight.

2. The propylene-based resin composition as claimed in claim 1, wherein the component (A) satisfies the following requirements (1) to (4):

(1) The propylene-based resin of (A) comprises (a) from 70 to 98% by weight of a fragment insoluble in para-xylene at 23° C. and (b) from 2 to 30% by weight of a fragment soluble in para-xylene at 23° C.;

(2) The fragment (a) has a relaxation time, $\tau$, of from 0.01 to 0.35 seconds at an angular frequency, $\omega$, of $10°/\text{sec}$ as obtained through melt viscoelastometry, and has a molecular weight distribution index (PDI) of from 1 to 18, which is represented by $\omega_2/10\omega_1$ where $\omega_1$ indicates an angular frequency at which the modulus of stored elasticity, G', as obtained through melt viscoelastometry is $2 \times 10_2$ Pa, and $\omega_2$ indicates an angular frequency at which G' is $2 \times 10^4$ Pa;

(3) The fragment (b) has a limiting viscosity [$\eta$] in decalin at 135° C. of from 2.0 to 10 dl/g; and (4) The ethylene unit content of (A) is from 1 to 17% by weight.

3. The propylene-based resin composition as claimed in claim 1, wherein the ethylene-$C_{3-18}$ $\alpha$-olefin copolymer of the component (B) has an $\alpha$-olefin content of from 20 to 70% by weight.

4. An automobile trim member as produced by injection-molding the propylene-based resin composition of claim 1.

5. An automobile trim member as produced by injection-molding the propylene-based resin composition of claim 3.

6. The propylene-based resin composition as claimed in claim 2, wherein the ethylene-$C_3$–$C_{18}$ $\alpha$-olefin copolymer of the component (B) has an $\alpha$-olefin content of from 20 to 70% by weight.

7. An automobile trim member as produced by injection-molding the propylene-based resin composition of claim 2.

8. The propylene-based resin composition as claimed in claim 1, wherein the component (A) has a melt index of from 1 to 100 g/10 min.

9. The propylene-based resin composition as claimed in claim 8, wherein the component (A) has a melt index of from 5 to 70 g/10 min.

10. The propylene-based resin composition as claimed in claim 9, wherein the component (A) has a melt index of from 10 to 40 g/10 min.

11. The propylene-based resin composition as claimed in claim 1, wherein the component (A) is a mixture of a propylene-based resin having a melt index of larger than 8 g/10 min, and of from 5 to 30% by weight of said mixture, of a propylene-based resin having a melt index of smaller than 5 g/10 min.

12. The propylene-based resin composition as claimed in claim 1, wherein the component (B) has a density of from 0.855 to 0.870 g/cm³.

13. The propylene-based resin composition as claimed in claim 1, wherein the component (B) has a melt index of from 0.01 to 6 g/10 min.

14. The propylene-based resin composition as claimed in claim 13, wherein the component (B) has a melt index of from 0.01 to 1 g/10 min.

15. The propylene-based resin composition as claimed in claim 1, wherein the talc is in the form of grains having a mean grain size of from 1 to 8 $\mu$m and a mean aspect ratio of not smaller than 4.

* * * * *

UNITED STATES PATENT AND TRADEMARK OFFICE
CERTIFICATE OF CORRECTION

PATENT NO.     : 6,034,165
DATED          : March 7, 2000
INVENTOR(S)    : Ryuzou Tomomatsu et al.

It is certified that error appears in the above-identified patent and that said Letters Patent is hereby corrected as shown below:

Column 2,
Line 34, "(in decalin at 135°C.)" should read -- (in decalin at 135°C) --;
Line 61, "23°C." should read -- 23°C --.

Column 3,
Line 11, "23°C." should read -- 23°C --;
Line 12, "130°C." should read -- 130°C --;
Line 13, "23°C.," should read -- 23°C, --;
Lines 30 and 51, "175°C." should read -- 175°C --.

Column 4,
Line 24, "(1 to 100 g/10) min," should read -- 1 to 100 g/10 min, --;
Line 24, "230°C." should read -- 230°C --;
Line 32, "(5 to 70 g/10 min)" should read -- 5 to 70 g/10 min; --;
Line 33, "from (10 to 40 g/10 min.)" should read -- from 10 to 40 g/10 min. --;
Line 34, "is (a" should read -- is a --;
Line 40, "by weight)" should read -- by weight, --.

Column 6,
Line 29, "(0.01 and 6 g/10 min,)" should read -- 0.01 and 6 g/10 min; --;

Column 9,
Line 46, "70°C." should read -- 70°C --.

Column 10,
Line 1, "90°C.," should read -- 90°C, --;
Line 6, "110°C.," should read -- 110°C, --;
Line 31, "85°C." should read -- 85°C --;
Line 40, "70°C." should read -- 70°C --;
Line 64, "220°C." should read -- 220°C --.

UNITED STATES PATENT AND TRADEMARK OFFICE
CERTIFICATE OF CORRECTION

PATENT NO. : 6,034,165
DATED : March 7, 2000
INVENTOR(S) : Ryuzou Tomomatsu et al.

It is certified that error appears in the above-identified patent and that said Letters Patent is hereby corrected as shown below:

Column 13,
Line 7, "23°C." should read -- 23°C --;
Line 16, "2 x $10_2$" should read -- 2 x $10^2$ --.

Signed and Sealed this

Twenty-third Day of November, 2004

JON W. DUDAS
*Director of the United States Patent and Trademark Office*